United States Patent
Pfauch et al.

(10) Patent No.: US 11,428,610 B2
(45) Date of Patent: Aug. 30, 2022

(54) RETRACTABLE ASSEMBLY FOR IMMERSION, FLOW AND MOUNTED MEASURING SYSTEMS IN ANALYTICAL PROCESS TECHNOLOGY

(71) Applicant: Endress+Hauser Conducta GmbH+Co. KG, Gerlingen (DE)

(72) Inventors: Thomas Pfauch, Leipzig (DE); Jens Bindrich, Klingenberg (DE); Angela Eubisch, Chemnitz (DE); Arne Kleinpeter, Neustadt an der Weinstraße (DE); Carsten Schippan, Grimm (DE); Jörg Uhle, Limbach-Oberfrohna (DE); Melanie Ullrich, Gerlingen (DE)

(73) Assignee: ENDRESS+HAUSER CONDUCTA GMBH+CO. KG, Gerlingen (DE)

( * ) Notice: Subject to any disclaimer, the term of this patent is extended or adjusted under 35 U.S.C. 154(b) by 107 days.

(21) Appl. No.: 17/128,861

(22) Filed: Dec. 21, 2020

(65) Prior Publication Data

US 2021/0190642 A1 Jun. 24, 2021

(30) Foreign Application Priority Data

Dec. 20, 2019 (DE) ...................... 10 2019 135 595.8

(51) Int. Cl.
*G01N 1/12* (2006.01)
*G01F 23/30* (2006.01)

(52) U.S. Cl.
CPC ............... *G01N 1/12* (2013.01); *G01F 23/30* (2013.01)

(58) Field of Classification Search
CPC .................................. G01N 1/12; G01F 23/02
See application file for complete search history.

(56) References Cited

U.S. PATENT DOCUMENTS

| 4,757,710 A * | 7/1988 | Haynes | B63H 20/32 |
| | | | 220/663 |
| 5,011,587 A * | 4/1991 | Schmidt | G01N 27/283 |
| | | | 204/409 |
| 8,578,798 B2 * | 11/2013 | Pfauch | G01N 27/283 |
| | | | 73/866.5 |

(Continued)

FOREIGN PATENT DOCUMENTS

| DE | 3523190 A1 | 1/1987 |
| DE | 3834240 A1 | 4/1990 |

(Continued)

*Primary Examiner* — John Fitzgerald
(74) *Attorney, Agent, or Firm* — Kelly J. Smith; Endress+Hauser (USA) Holding Inc.

(57) ABSTRACT

The present disclosure discloses a retractable assembly for immersion, flow and mounted measuring systems in analytical process technology for receiving a sensor which is designed to measure at least one measurement variable of a medium in a container, comprising: a substantially hollow-cylindrical housing comprising a housing wall, a service chamber which is formed in the interior in a region of the housing, and a dip tube which is axially movable in the housing between a service position moved out of the medium and a process position moved into the medium, the dip tube being positioned in the service chamber in the service position, the sensor being receivable in the dip tube, wherein at least one optical window is arranged in the housing wall in the region of the service chamber.

9 Claims, 3 Drawing Sheets

(56) References Cited

U.S. PATENT DOCUMENTS

| | | | | |
|---|---|---|---|---|
| 9,091,570 | B2* | 7/2015 | Pfauch | G01D 11/245 |
| 9,228,863 | B2* | 1/2016 | Schneider | G01D 11/24 |
| 9,243,714 | B2* | 1/2016 | Wunderlich | F16K 11/0712 |
| 9,335,440 | B1* | 5/2016 | Glenn | G01F 23/64 |
| 10,209,105 | B2* | 2/2019 | Schneider | G01N 27/283 |
| 2013/0036843 | A1* | 2/2013 | Pfauch | G01D 11/245 |
| | | | | 73/866.5 |

FOREIGN PATENT DOCUMENTS

| | | |
|---|---|---|
| DE | 102009031946 A1 | 1/2011 |
| DE | 102016111111 A1 | 12/2017 |

* cited by examiner

RETRACTABLE ASSEMBLY FOR IMMERSION, FLOW AND MOUNTED MEASURING SYSTEMS IN ANALYTICAL PROCESS TECHNOLOGY

CROSS-REFERENCE TO RELATED APPLICATION

The present application is related to and claims the priority benefit of German Patent Application No. 10 2019 135 595.8, filed on Dec. 20, 2019, the entire contents of which are incorporated herein by reference.

TECHNICAL FIELD

The present disclosure relates to a retractable assembly for immersion, flow and mounted measuring systems in analytical process technology for receiving a sensor which is designed to measure at least one measurement variable of a medium in a container.

BACKGROUND

A great variety of retractable assemblies are offered and marketed by the Endress+Hauser corporate group, for example under the name "Cleanfit CPA871." Information about them can be found on the applicant's website, for example regarding the filing date under: http://www.endress.com/cpa871.

Retractable assemblies are widely used in analytical measurement technology and process automation. They are used to remove sensors from the process, and thus the medium, without interrupting the process, and to then reintroduce them into the process. The sensors are fastened in a dip tube and are moved axially by hand or automatically, for example pneumatically, by means of a drive between a process position (measurement) and a service position (maintenance, calibration, flushing, probe exchange, etc.). These processes take place within a certain period of time, depending on the drift of the measured value or the contamination of the measuring element. The sensors are used to measure one or more physical or chemical process variables.

The field of use of retractable assemblies for measuring physical or chemical process variables of a medium, for example a fluid, such as, a liquid, in process technology is many-faceted. Sensors are used to determine the process variables, wherein the sensors are, for example, pH sensors, conductivity sensors, optical or electrochemical sensors for determining a concentration of a substance contained in the medium to be monitored, such as $O_2$, certain ion species, organic compounds, or the like.

If retractable assemblies are used for receiving the sensor for determining at least one process variable, the sensor can be checked, calibrated, cleaned and/or replaced in the service position, wherein the sensor is located in the so-called service chamber. So that the medium is not contaminated by the calibration, flushing or cleaning liquid, the service chamber is sealed off in the service position from the container in which the medium is located in such a way that no exchange of medium/liquid can take place. Usually, for this purpose, a seal is located at the medium-side end of the housing of the retractable assembly and, in interaction with a closure element on the dip tube, prevents the exchange of medium/liquid.

Replaceable assemblies are also used under adverse conditions, for example for measuring potentially hazardous or toxic substances. It is currently not possible to detect a sensor breakage without removing the sensor, i.e., the user may not notice that his medium to be measured is running into the service chamber. A deposit formation of the sensor or a need for cleaning of the sensor is likewise not detectable. Defects on the dip tube or in the service chamber itself are also not detected. A defect of the seal separating the process from the service chamber is also not detected. Verification of the sensor cleaning is difficult or impossible; this can only take place by removing the sensor. In general, it is not possible to determine the condition of the assembly, the sensor and/or the process seal within the service chamber, and contamination of and damage to the sealing system or chemical attack cannot be detected without disassembling the assembly.

SUMMARY

The object of the present disclosure is to enable early detection of a safety problem or a user hazard and/or process hazard due to wear, a fault or contamination.

The object is achieved by a retractable assembly for immersion, flow and mounted measuring systems in analytical process technology for receiving a sensor which is designed to measure at least one measurement variable of a medium in a container, comprising: a substantially hollow-cylindrical housing comprising a housing wall, a service chamber which is formed in the interior in a region of the housing, and a dip tube which is axially movable in the housing between a service position moved out of the medium and a process position moved into the medium, wherein the dip tube is positioned in the service chamber in the service position, wherein the sensor is receivable in the dip tube. The assembly includes at least one optical window is arranged in the housing wall in the region of the service chamber.

The integration of at least one optical window, allowing a view from the outside, directly to the service chamber makes it possible to visually inspect the state in the interior of the assembly of the assembly, or to detect deposits, a chemical attack or contamination at an early stage. This is used, for example, to optimize maintenance cycles and allows potentially drastically increased wear (due to deposits, for example) to be detected at an early stage. Possible contaminations, which can negatively influence sensor adjustments/calibrations, are also detected in a simple manner. Early detection of a potential impairment of the process seal (ingress of process medium in the service position and the process position) is made possible.

The integration of at least one optical window directly to the service chamber also makes it possible to visually inspect the state of the sensor, such as, in the case of non-transparent media in the service position, as well as to verify sensor cleaning with positive effects during the optimization of cleaning cycles and fault identification in the event of impairment of the measuring chain. It is likewise possible to detect glass breakage of the sensor without having to remove the sensor.

The integration of at least one optical window directly to the service chamber also allows a visual inspection to detect potential hazards due to a damaged or destroyed sealing system, in both the process position and the service position, before work is carried out on the assembly. This can be done by emptying the chamber in a targeted manner (for example by means of a valve) and, after re-closing it, observing the seepage of medium.

The fact that a film is present on the window is simultaneously an indication that the dip tube and sensor also need to be cleaned. By means of the present claims, the window can be cleaned automatically together with the cleaning of the sensor. As a result, the transparency of the window is ensured for a significantly longer period, and the service life is thus significantly increased.

One or more windows can be integrated by mounting a finished purchase part into the service chamber or by an optimized proprietary design at the service chamber itself. The maximum size of the window can be adapted to the available installation space of the service chamber.

In one embodiment, the window is joined to the housing wall by means of gluing, flange-mounting, pressing, clamping, welding and/or screwing.

In one embodiment, the window is made of glass; the window may be made of borosilicate glass, soda lime glass, aluminosilicate glass, one or more plastic materials, such as, PA, PC or PMMA, or window glass.

In one embodiment, the window is circular.

In one embodiment, the diameter of the window is 1 to 3 cm, such as, for example, 1.5 cm.

In one embodiment, the window is lens-shaped or comprises a lens.

In one embodiment, two windows arranged opposite one another are mounted in the housing wall. A flashlight, an LED, ambient illumination, etc. can then be used to shine light through a more turbid medium and to see more/better into the interior of the assembly.

In one embodiment, the service chamber comprises interior lighting.

In one embodiment, the service chamber comprises a sensor for detecting the fill level.

In one embodiment, the assembly comprises a sensor. In one embodiment, one of the windows comprises a reflection light barrier. A reflection element, which is introduced in a defined manner and located in front of the reflection light barrier in the service position, is provided on the sensor. It can thus be automatically established whether the sensor has been correctly extended, the sensor head is basically still there, and/or whether excessive contamination is present.

BRIEF DESCRIPTION OF THE DRAWINGS

What was described above is explained in more detail based on the following figures.

DETAILED DESCRIPTION

In the figures, the same features are identified by the same reference signs.

"Top," "above," and related terms within the meaning of this present disclosure mean facing away from the measuring medium 14. "Bottom," "below," and related terms within the meaning of this present disclosure mean facing the medium 14.

Figure 1:
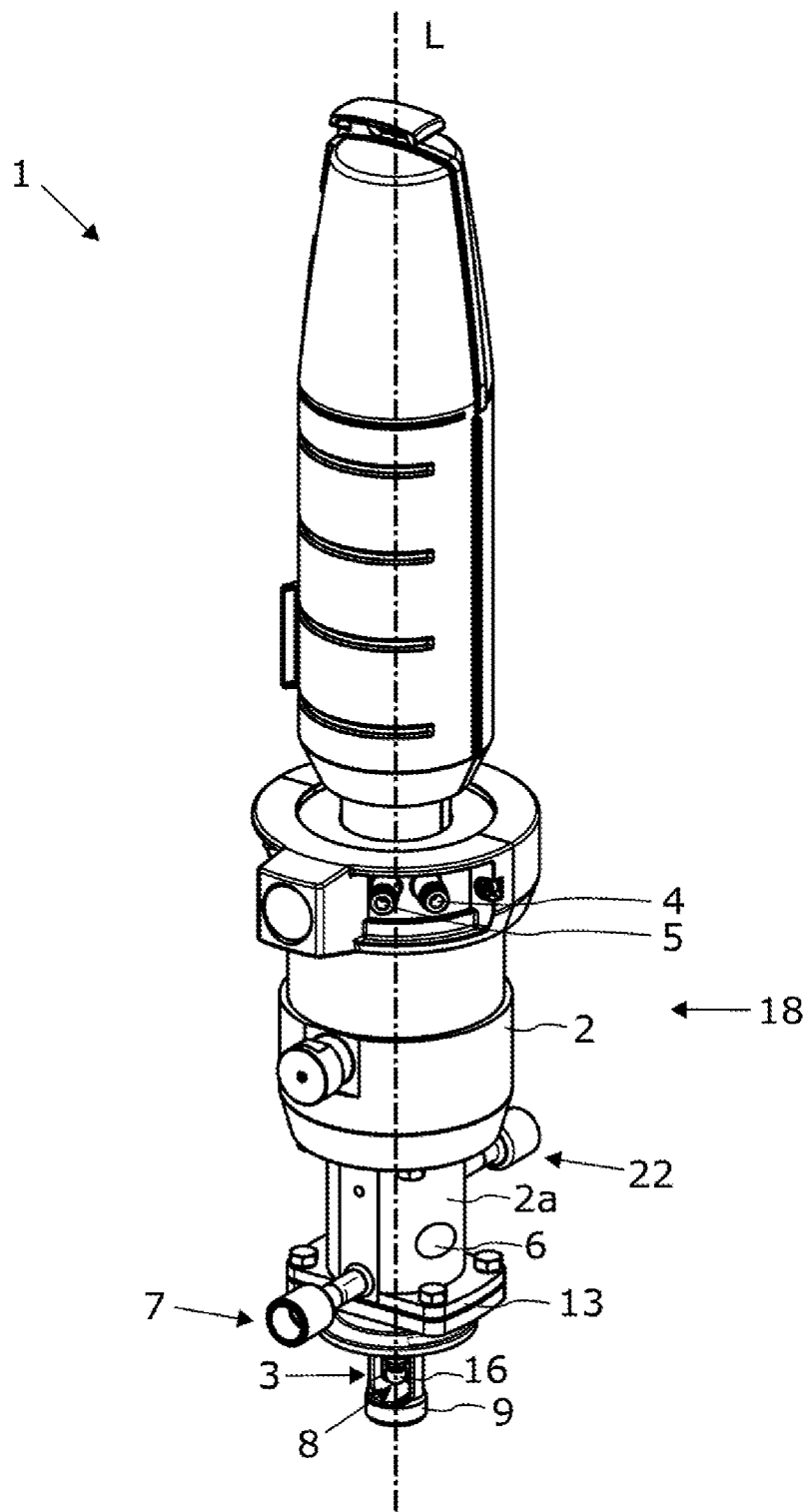
FIG. 1 shows the claimed retractable assembly.
Figure 2:
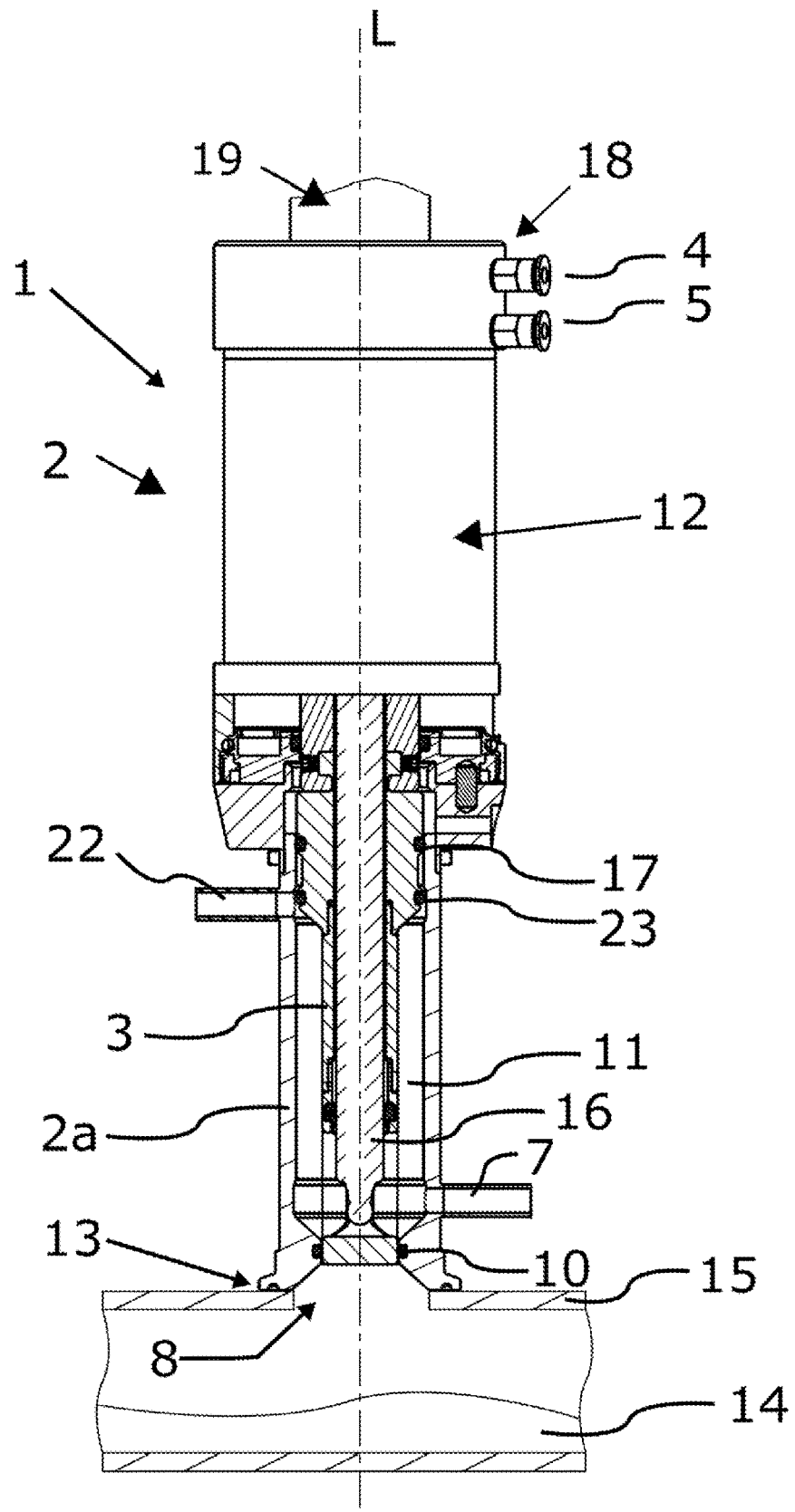
FIG. 2 shows the claimed retractable assembly in cross-section.

The claimed retractable assembly is denoted in its entirety by reference sign 1 and is shown in FIGS. 1 to 3. The retractable assembly 1 consists of a substantially cylindrical housing 2 which can be connected to a container 15 by means of a connecting means 13. The housing 2 is formed by the housing wall 2a. The connecting means 13 can be, for example, designed as a flange connection, made of, for example, stainless steel. However, other embodiments are possible. The measuring medium 14 to be measured is located in the container. The container 15 can be, for example, a tank, boiler, tube, pipeline or the like.

FIG. 1 shows the retractable assembly 1 in the process position. This is explained in more detail below. FIG. 2 shows the retractable assembly 1 in the service position.

A dip tube 3 is guided inside the housing 2. A sensor 16 is arranged inside the dip tube 3. The sensor 16 is connected to the dip tube 3 by a receptacle, which is not described in greater detail, for example by way of a screw connection. The sensor 16 within the meaning of this present disclosure includes sensors for measuring one or more physical or chemical process variables. These are, for example, the pH value, also via an ISFET, redox potential, absorption of electromagnetic waves in the medium 14, for example with wavelengths in the UV, IR, and/or visible ranges, oxygen, conductivity, turbidity, concentration of metal and/or non-metal materials, or temperature. The sensor 16 has access to the medium 14 via an opening 8 in the dip tube 3. In this case, the opening 8 is designed in such a way that it is open in the flow direction, that is, that the measuring medium 14 optimally flows to the sensor 16, such as, when the retractable assembly 1 is used in a pipeline.

The sensor 16 is connected to the channel 19. The cable, in turn, is connected to a transmitter, which is not shown.

The dip tube 3 can be produced from various materials. The prior art discloses dip tubes 3 made of steel or stainless steel. However, applications, in which highly resistive materials are used, are common, such as, in the chemical industry. The dip tube 3 can thus also be made of a plastic, such as polyether ether ketone (PEEK), polytetrafluoroethylene (PTFA), a perfluoroalkoxy polymer (PFA), another plastic or resistant metals, such as Hastelloy. A ceramic may also be used. Another option is the use of one or more coatings of the aforementioned polymers. The same is true for the housing 2.

The dip tube 3 is mounted so as to be axially displaceable in the direction of the medium 14, or in the direction facing away from the medium 14, along the central axis L. The dip tube 3 can be moved between the service position (shown in FIG. 2) retracted into the housing 2 and the process position (shown in FIG. 1) extended out of the housing 2. The measurement takes place in the process position. The sensor 16 has access to the medium 14 through the cage-like opening 8 in the dip tube 3. A wide variety of service tasks, such as cleaning or calibration, are performed in the service position. Flushing/cleaning/calibration and/or sterilization medium can be admitted into the service chamber 11 through the connection 7, see below). The flushing/cleaning/calibration and/or sterilization medium can be liquid or gaseous. The liquid can drain again through the corresponding connection 22, which can be positioned at both an axial and radial offset from the connection 7. The flushing direction can also be reversed.

The displacement of the dip tube 3 is performed by a drive device 18 located above the service chamber 11. The drive 18 is part of the housing 2. The housing 2 comprises a housing interior 12. The movement is carried out, for example, by an automatic drive, such as by supply energy. If supply energy is introduced through the connection 4, the dip tube 3 moves from the service position into the process position. The connection 5 then serves as an outlet. If supply energy is introduced through the connection 5, the dip tube 3 moves from the process position into the service position. The connection 4 then serves as an outlet. Pneumatic, hydraulic or electric drives are, for example, known from the prior art. The shown retractable assembly uses a pneumatic drive. A manual movement is likewise possible. The process of displacing the dip tube 3 is explained in more detail below by means of a pneumatic drive.

A piston 24 (see FIG. 3a) is firmly connected to or an integral part of the dip tube 3. The piston 24 is designed, for example, as an annular piston and forms part of the drive 18. The piston 24 divides the drive portion of the housing interior 12 into an upper region and a lower region. The dip tube 3 can be moved via the connection 4 into the upper region and via a connection 5 into the lower region above or below the piston: When compressed air is brought into the upper region through the connection 4, the dip tube 3 moves in the direction of the medium 14, wherein air from the lower region simultaneously flows through the connection 5. Air can also be actively drawn from the lower region in order to support the movement in the direction of the medium 14. When compressed air is brought into the lower region through the connection 5, the dip tube 3 travels away from the medium 14, wherein air from the upper region simultaneously flows through the connection 4. Air can also be actively drawn from the upper region in order to support the movement.

Corresponding seals (not shown) can be used to ensure that compressed air does not escape and is only conducted through the connections 4, 5.

The connections 4, 5 are attached laterally to the housing 2. The connection 4 can be located above the piston (dip tube 3 in service position), the connection 5 can be located below the piston (dip tube 4 in process position). It is conceivable for both inlets 4, 5 to be located on the housing 2 above or below the piston and, for proper functioning, for a line to be guided into the respective other region in the interior of the housing 2. FIG. 1 shows that connections 4, 5 are arranged next to one another above the piston (service position). FIG. 2 shows them arranged one above the other. A corresponding line for guiding the connection 5 into the lower region is located in the interior of the housing 2. The connections 4, 5 do not necessarily have to be located in the same frontal plane.

The service chamber 11 is located in the interior 12 of the housing 2 and is formed by the wall 2a. The service chamber 11 is located directly above the connecting means 13 in the example. There is an inlet 7 and an outlet 22 to the service chamber 11.

If the dip tube 3 is in the service position, a portion of the dip tube 3, for example, the sensor 16, is located in the service chamber 11 for flushing, cleaning, calibrating, sterilizing, etc. The closure element 9 for process separation is located at the lower end of the dip tube 3. The closure element 9 seals off the service chamber 11 from the process, and thus from the measuring medium 14. The measuring medium may be hot, toxic, caustic, carcinogenic or otherwise harmful to humans and the environment. Combinations of these medium properties are also usually present in chemical plants. It must therefore be ensured that the closure element 9 seals reliably and permanently. For this purpose, various sealing devices are attached to the housing 2; such as, for example, one or more medium seals 10 are used. In the depicted embodiment, the medium seal 10 is arranged on the housing 2. Alternatively, the medium seal 10 may be arranged on the lower end region of the dip tube 3 (not shown).

At least one seal 17, in the example two seals 17, 23, is arranged on the upper region of the dip tube 3. The seal 17, 23 seals off the service chamber 11 from the drive device 18, particularly when moving from the service position to the process position and vice versa. In the service position, the upper seal 17 is arranged above the connection 22 and the lower seal 23 is arranged at the same height or below the connection 22.

Figure 3B:
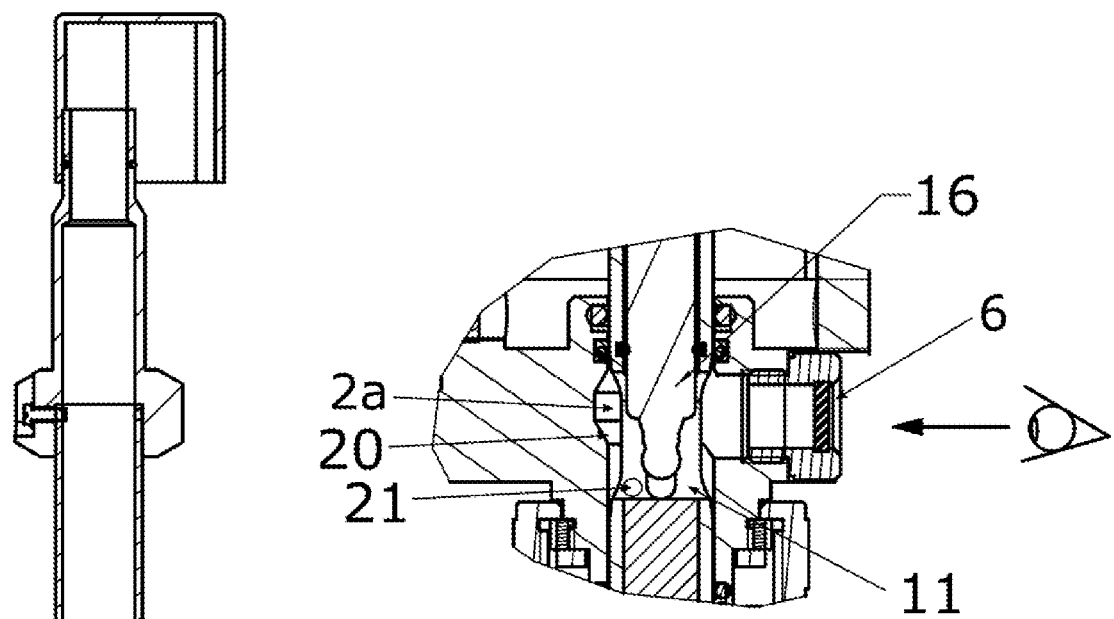
FIGS. 3 a/b show the claimed retractable assembly in cross-section, with FIG. 3a showing the overview and FIG. 3b showing an enlarged view.
Figure 3A:
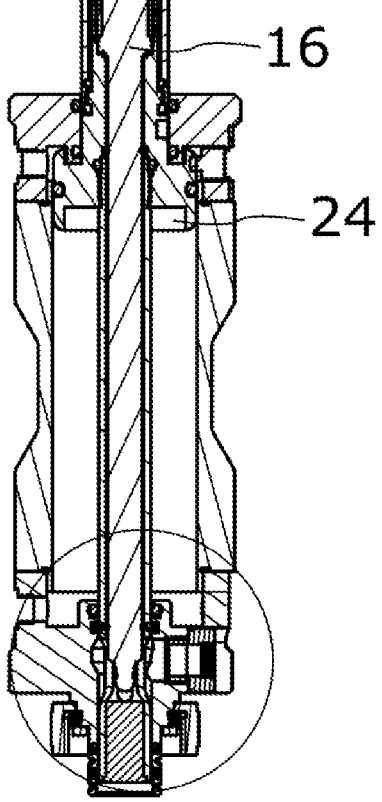

FIGS. 3a and 3b show a retractable assembly 1 in cross-section and, in comparison with FIG. 2, in a view rotated about the axis L. The connections 7, 22 cannot be seen here.

The retractable assembly 1 with the service chamber 11 comprises one or more windows 6 in the wall 2a. "Window" shall be understood to mean not only plane-parallel plates but also prismatic, spherical, aspherical or free-formed transparent bodies, e.g. also matched to the optical refractive index of the medium 14. The window 6 is mounted at the level of the sensitive element of the sensor 16. If the sensor 16 is designed as a pH sensor, the window 6 is arranged so as to be at the level of the pH-sensitive membrane.

The window 6 is joined to the wall 2a by gluing, flanging (flange-mounting), pressing, clamping, welding and/or screwing. It is circular and has a diameter of 1.5 cm, for example. The maximum size of the window 6 is adapted to the available installation space of the service chamber 11.

The window 6 is made, for example, of glass, more precisely of a borosilicate glass, soda lime glass, aluminosilicate glass, one or more plastic materials, such as, PA, PC or PMMA, or window glass.

The window 6 must be transparent to the radiation to be transmitted through it. For example, if the user wishes to check the content of the service chamber 11 by a simple visual inspection, the window must be transparent to visible light. This is illustrated in FIG. 3b by the eye.

Alternatively, a camera can also be connected to the window 6. This may be advantageous if the assembly 1 is attached in locations that are difficult to access. The camera can be designed as an infrared camera, the choice depending on the corresponding medium 14, and the window 6 must then accordingly be transparent to infrared radiation.

If the service chamber 11 is to be examined by a simple visual inspection, additional illumination 20 in the service chamber is expedient. This may be an LED mounted in the wall 2a.

In one embodiment, a sensor for detecting the fill level is mounted in the service chamber 11, in a simple embodiment as a float 21 which is, for example, ball-shaped.

It is also possible for more than one window to the service chamber 11, for example two windows, to be mounted. These are then arranged at an angle of 90° or 180° with respect to each other.

A variant with three windows (angle of 120° with respect to each other) or four windows (angle of 90° with respect to each other) is also possible.

In one embodiment, multiple windows, for example two windows arranged opposite one another, are mounted in the wall 2a.

When a window is located on the opposite side of the chamber 11, an LED is mounted behind it.

At least one of the windows is lens-shaped or comprises a lens and thus provides an enlarged view. This allows an even more detailed observation of the sensor surface.

In one embodiment, one or more windows are also arranged on a rotatable ring.

In one embodiment, one of the windows 6 comprises a reflection light barrier. A reflection element, which is introduced in a defined manner and located in front of the reflection light barrier in the service position, is provided on the sensor 16. It can thus be automatically established whether the sensor 16 has been correctly extended, the sensor head is basically still there (sensor breakage), and/or whether excessive contamination (possibly after the flushing process) is present.

The invention claimed is:

1. A retractable assembly for immersion, flow and mounted measuring systems in analytical process technology for receiving a sensor which is designed to measure at least one measurement variable of a medium in a container, comprising
    a substantially cylindrical housing with a housing wall,
    a service chamber which is formed in the interior in a region of the housing, and
    a dip tube which is movable axially in the housing between a service position moved out of the medium and a process position moved into the medium,
    the dip tube being positioned in the service chamber in the service position,
    the sensor being receivable in the dip tube,
    wherein at least one optical window is arranged in the housing wall in the region of the service chamber.

2. The retractable assembly of claim 1,
wherein the window is joined to the housing wall using gluing, flanging, pressing, clamping, welding or screwing.

3. The retractable assembly of claim 1,
wherein the window is made of glass.

4. The retractable assembly of claim 1,
wherein the window is lens-shaped or comprises a lens.

5. The retractable assembly of claim 1,
wherein two windows arranged opposite one another are mounted in the housing wall.

6. The retractable assembly of claim 1,
wherein the service chamber comprises interior lighting.

7. The retractable assembly of claim 1,
wherein the service chamber comprises a sensor for fill level detection.

8. The retractable assembly of claim 1,
wherein the window is circular.

9. The retractable assembly of claim 8,
wherein the diameter of the window is 1 to 3 cm.

* * * * *